United States Patent
Huh et al.

(10) Patent No.: US 7,054,169 B2
(45) Date of Patent: May 30, 2006

(54) SWITCHED-MODE POWER SUPPLY SUPPORTING BURST-MODE OPERATION

(75) Inventors: Dong-Young Huh, Bucheon (KR); Yong-Jin Joo, Bucheon (KR)

(73) Assignee: Fairchild Korea Semiconductor, Ltd. (KR)

( * ) Notice: Subject to any disclaimer, the term of this patent is extended or adjusted under 35 U.S.C. 154(b) by 0 days.

(21) Appl. No.: 10/163,801

(22) Filed: Jun. 5, 2002

(65) Prior Publication Data

US 2003/0042879 A1    Mar. 6, 2003

(30) Foreign Application Priority Data

Aug. 28, 2001  (KR) .................... 10-2001-0052116

(51) Int. Cl.
  *H02M 3/335* (2006.01)
(52) U.S. Cl. .................. 363/21.16; 363/21.9
(58) Field of Classification Search ............. 363/21.4, 363/21.7, 21.9, 21.8, 21.12, 21.16, 21.95, 363/97, 21.1, 41, 131, 40, 16, 95; 323/222, 323/275, 282, 285; 307/64, 65, 66
See application file for complete search history.

(56) References Cited

U.S. PATENT DOCUMENTS

| | | | | |
|---|---|---|---|---|
| 5,689,407 A | * | 11/1997 | Marinus et al. | 363/49 |
| 5,852,550 A | * | 12/1998 | Majid et al. | 363/19 |
| 6,208,538 B1 | * | 3/2001 | Halamik et al. | 363/41 |
| 6,252,783 B1 | * | 6/2001 | Huh et al. | 363/21.01 |
| 6,292,376 B1 | * | 9/2001 | Kato | 363/21.09 |
| 6,333,862 B1 | * | 12/2001 | Lee et al. | 363/21.16 |
| 6,352,783 B1 | * | 3/2002 | Fagerburg | 428/480 |

* cited by examiner

*Primary Examiner*—Rajnikant B. Patel
(74) *Attorney, Agent, or Firm*—Kenneth E. Horton; Kirton & McConkie

(57) ABSTRACT

A switched-mode power supply (SMPS) that operates in a burst mode when an electronic device that receives power from the SMPS demands a low level of power as when in a stand-by mode or cut-off mode. The SMPS contains a first power supply unit for receiving a power and rectifying it, and, according to a level of an output for the load, distinguishing between a normal mode and a burst mode to perform switching according to a timing corresponding to the normal mode and the burst mode to supply a first power. The SMPS also contains an output power supply unit for receiving the first power from the first power supply unit according to a winding ratio of a coil to generate a power for driving the load.

27 Claims, 7 Drawing Sheets

US 7,054,169 B2

SWITCHED-MODE POWER SUPPLY SUPPORTING BURST-MODE OPERATION

FIELD OF THE INVENTION

The present invention relates to the field of switched-mode power supplies (SMPS). More particularly, the present invention relates to a switched-mode power supply that operates in a normal mode when a power consumption load is large and in a burst mode when a power consumption load is low.

BACKGROUND OF THE INVENTION

With the ongoing development in electronics technology, more and more products used in the home and at work are electronically based. Televisions, VCRs, computers and their monitors, printers, copiers, etc., are common electronic devices, and such devices require a source of power for operation. However, electronic devices are not able to directly use the 110V or 220V provided by electric power companies, and said electronic devices are installed with semiconductors, etc., that are driven by roughly 5V to 10V. A power supply performs the operation of transforming the 110V or 220V source to a suitable level of voltage, e.g., 5V to 10V.

The switched-mode power supply is used in many electronic products since it is able to supply a stable power. A conventional switched-mode power supply is shown in FIGS. 1–4. Referring to FIG. 1, the switched-mode power supply, which receives an input power (Vin) and provides an output power (Vo) according to a load includes, a first power supply unit (100) that receives the input power (Vin) and undergoes switching according to variations in the output power (Vo) to thereby supply a power, the variations in the output power (Vo) occurring according to a load; and an output power supply unit (200) that receives the power output by said first power supply unit (100) through a coil winding ratio and generates an output power (Vo) for driving a load.

The first power supply unit (100) includes a first power converter (110) for receiving the input power (Vin), rectifying the same, then outputting a resulting power; an output power sensing unit (120) for sensing the output power (Vo) that is output to the load from said output power supply unit (200); a switching controller (150), which outputs a signal for controlling the timing of the switching of said output power according to a signal output from the output power sensing unit (120); and a switching transistor (MOS130) that switches On and Off to transmit the power converted by the first power converter (110) to the output power supply unit (200).

The first power converter (110) includes a bridge circuit (BR110) that receives the input power (Vin), performs a wave rectification of said input power, then outputs a resulting power; a first resistor (R111), with a first terminal connected to an output terminal of said bridge circuit (BR110); a capacitor (C110), with a first terminal connected to a second terminal of said resistor (R111), and a second terminal which is grounded; a first coil (L110), with a first terminal connected to the second terminal of said resistor (R111), and a second terminal connected to a drain of switching transistor (MOS130); and a second resistor (R112), with a first terminal connected to the output terminal of said bridge circuit (BR110).

The output power sensing unit (120) includes, a phototransistor (PT120) for receiving, through a base thereof, an output power that is sensed and undergoes feedback from the output power supply unit (200), said phototransistor (PT120) receiving the output power as a light signal; a first capacitor (C120), with a first terminal connected to a collector of said phototransistor (PT120), and a second terminal which is grounded; a diode (D120), with a cathode connected to the collector of said phototransistor (PT120); a power sensing coil (L120), with a first terminal connected to an anode of said diode (D120), and a second terminal which is grounded, the power sensing coil (L120) being connected in parallel to the first coil (L110) of the first power converter (110); a first resistor (R120), with a first terminal connected to an emitter of said phototransistor (PT120); a second capacitor (C121), with a first terminal connected to the second terminal of said first resistor (R120), and a second terminal which is grounded; a second resistor (R121), with a first terminal connected to the second terminal of said first resistor (R120), and a second terminal connected to the source of said switching transistor (MOS130); and a third resistor (R122), with a first terminal connected to the source of said switching transistor (MOS130), and a second terminal which is grounded.

The switching controller (150) includes a comparator (COM150), with a non-inverting terminal which receives a sensed signal from the output power sensing unit (120), and an inverting terminal which receives a first reference voltage of a predetermined value; a flip-flop (SR150), with a reset terminal connected to an output terminal of said comparator (COM150), and a set terminal which is connected to a clock signal; an OR gate (OR150), with a first input terminal connected to an inverted output terminal of the flip-flop (SR150), and a second input terminal connected to the clock signal; a first transistor (Q151), with a collector connected to a drive power source (Vcc), a base connected to an inverted output terminal of the OR gate (OR150), and an emitter connected to a gate of the switching transistor (MOS130); and a second transistor (Q152), with a base connected to a non-inverted output terminal of the OR gate (OR150), and a collector connected to the gate of the switching transistor (MOS130).

The output power supply unit (200) includes an output power generating unit (210) that receives the power output from the first power supply unit (100) and generates a power for driving a load; and an output power feedback unit (220) for sensing the power generated by an output from the output power generating unit (210) and performing feedback of the power to the first power supply unit (100).

The output power generating unit (210) of the output power supply unit (200) includes a second coil (L210) for receiving the power applied from the first power supply unit (100) through an induced current; a diode (D210), with an anode connected to a first terminal of the second coil (L210) (a second terminal of the second coil (L210) being grounded); and a capacitor (C210), with a first terminal connected to a cathode of the diode (D210), and a second terminal which is grounded.

The output power feedback unit (220) of the output power supply unit (200) includes a first resistor (R220), with a first terminal which receives the output power of the output power generating unit (210); a second resistor (R230), with a first terminal connected to a second terminal of said first resistor (R220), and a second terminal which is grounded; an operational amplifier (OP260), with an inverting terminal connected to the second terminal of said first resistor (R220), and a non-inverting terminal which receives a reference voltage; a transistor (Q270), with a base connected to an output terminal of the operational amplifier (OP260), and an emitter which is grounded; a capacitor (C250), with a first terminal connected to the second terminal of said first resistor (R220); a fourth resistor (R250), with a first terminal connected to a second terminal of said capacitor (C250), and a second terminal connected to a collector of said transistor (Q270); a third resistor (R240), with a first terminal which receives an output power of the output power generating unit (210); and a photodiode (PD240), with an anode connected to a second terminal of said third resistor (R240), a cathode connected to the collector of said transistor (Q270) to emit a light proportional to an amount of a current passing through the photodiode (PD240) for output to the first power supply unit (100).

The conventional switched-mode power supply structure operated in the following manner. The first power supply unit (100) typically receives the input power (Vin) and generates a power of a suitable level. This power is output through the first coil (L110) by the switching operation of the switching transistor (MOS130).

The output power supply unit (200) receives the power by induction through the second coil (L210), which opposes the first coil (L110), then provides a power required to drive various electronic devices. The power applied from the first power supply unit (100) and the power supplied to the load are adjusted by the charging and discharging of the capacitor (C210).

In order to control the On and Off operation of the switching transistor (MOS130), which regulates the power applied to the output power supply unit (200), the first power supply unit (100) senses the level of the output power (Vo) that is supplied to the load from the output power supply unit (200), and receives feedback of the output power (Vo). The sensing operation is performed in the output power feedback unit (220), and the transmission of the feedback signal is performed by a photo coupler, which is realized by the photodiode (PD240) and the phototransistor (PT120) of the first power supply unit (100).

That is, part of the output power (Vo) inverted in the capacitor (C210) of the output power generating unit (210) is detected by a resistance ratio between the first resistor (R220) and the second resistor (R230) of the feedback unit (220), then this value is compared in the operational amplifier (OP260) with a pre-installed reference voltage (Vref). Accordingly, a current ($I_{photo}$) flowing to the photodiode (PD240) is determined. The photodiode (PD240) then emits a corresponding amount of light, which is sensed in the phototransistor (PT120) of the output power sensing unit (120) by passing through the base of the phototransistor (PT120).

As a result, a current (Ipt) of an amount corresponding to the amount of light sensed by the phototransistor (PT120) is generated, after which the current (Ipt) flows to the second resistor (R121) through the first resistor (R120). A resulting voltage drop $V_{R121}$ across the second resistor (R121) is combined with a voltage $V_{R122}$ of the third resistor (R122) such that an output value of the comparator (COM150) varies according to the voltage drop $V_{R121}$ across the second resistor (R121).

Further, the second resistor (R121) and the second capacitor (C121) turn on the switching transistor (MOS130) to thereby operate as a filter circuit for preventing noise occurring as a result of a surge current. That is, if the output value of the comparator (COM150) is a logical HIGH value, the flip-flop (SR150) is reset such that the output value of the non-inverting terminal of the OR gate (OR150) becomes LOW and the output value of the inverting terminal of the OR gate (OR150) becomes HIGH.

The value of the output signal of said OR gate (OR150) is determined by an output signal of a clock generator (OSC) as shown in A of FIG. 2, and by the value of the inverting output terminal of the flip-flop (SR150) as shown in D of FIG. 2. Further, the value of the inverting output terminal of said flip-flop (SR150) is determined by the output signal of the comparator (COM150) as shown in C of FIG. 2, and the output signal of said comparator (COM150) is determined by a current (Isense) input to the non-inverting input terminal of the comparator (COM150) as shown in B of FIG. 2.

The value of the inverting output terminal of said OR gate (OR150), with input to the base of the first transistor (Q151), is opposite the output signal of the inverting output terminal of said flip-flop (SR150). In addition, if the second transistor (Q152) is turned On, the switching transistor (MOS130) is turned Off such that power transmission does not occur. However, if said first transistor (Q151) is turned On, the said switching transistor (MOS130) is turned On such that a first power is transmitted to the output power supply unit (200).

Therefore, in summary, if the output power (Vo) is increased, the amount of the current ($I_{photo}$) flowing to the photodiode (PD240) is increased, and at the same time, the current (Ipt) flowing to the phototransistor (PT120) is also increased. Accordingly, the voltage drop across the second resistor (R121) is increased, and a DC offset voltage rises, resulting in a reduction in the On time of the switching transistor (MOS130).

If the On time of the switching transistor (MOS130) is reduced, the power transmitted to the output power supply unit (200) is reduced, and the time that the capacitor (C210) of the output power generating unit (210) is charged is reduced. This ultimately results in a reduction of the output power (Vo).

As described above, the conventional switched-mode power supply detects the output power (Vo), and adjusts the switching time of the switching transistor (MOS130) according to this value to thereby vary the output power (Vo). Typically, the conventional switched-mode power supply operating as described above is used to provide a stable supply of power to televisions, computer monitors, VCRs, etc. Such electronic devices often use a remote control to provide convenience to the user. With the provision of this capability, a minimum of transmitting and receiving circuitry is provided to enable control signals of the remote control to be received even when the controlled device is not being used. That is, a stand-by mode is supported in these devices with remote-control capability.

However, with the conventional switched-mode power supply operating as described above, even in a cut-off mode or stand-by mode, in which the power load is low as when the electronic device is not operating and only a minimal amount of stand-by power is required, the electronic device comes to operate in a normal mode identical to when the device is normally operating, and the power loss occurring as a result of the switching operation of the switching transistor (MOS130) is greater than when power is supplied to a load.

That is, there is always a loss of power in the conventional switched-mode power supply because of the switching operation of the switching transistor (MOS130). In the case where an electronic device operates normally such that the load is large, the switching loss is not as large as the power transmitted to the electronic device. However, if the electronic device operating as a load is in a cut-off mode or a stand-by mode, although there is not a large demand of power for operation since only a minimum amount of circuitry required to maintain such a stand-by state is operated, a great deal of power loss nevertheless occurs by the switching operation of the switching transistor (MOS130).

Further, the amount of time that the switching transistor (MOS130) is controlled to On decreases in tandem with decreases in the size of the load. If the size of the load is extremely small, the amount of time the switching transistor (MOS130) is controlled to On also decreases significantly. If this short On time of the switching transistor (MOS130) is unable to be realized by the circuit, suitable power supply control is not possible.

SUMMARY OF THE INVENTION

The present invention provides a switched-mode power supply, in which when an electronic device receiving power from the power supply operates in a cut-off mode or stand-by mode to demand a small amount of power, the power supply operates in a burst mode to reduce the amount of switching loss, and when a load size is extremely small, suitable power supply control is realized.

The present invention also provides a switched-mode power supply supporting burst-mode operation, in which the power supply provides an output power to a load. The power supply includes a first power supply unit for receiving an input power and rectifying the power, and, according to a level of an output for the load, distinguishing between a normal mode and a burst mode to perform switching according to a timing corresponding to one of the normal mode and the burst mode to supply a first power; and an output power supply unit for receiving the first power from the first power supply unit according to a winding ratio of a coil to generate an output power for driving the load.

The first power supply unit includes a first power converter for receiving the input power, rectifying the input power, then outputting a resulting power; an output power sensing unit for sensing the output power that is output to the load from the output power supply unit and outputting a corresponding signal; a mode determination unit for determining when conditions for operation in a burst mode are satisfied, the mode determination unit performing this operation using a level of the signal output by the output power sensing unit, and the mode determination unit generating and outputting a corresponding signal; a switching controller for outputting a signal to control the timing of the switch according to the signal output from the output power sensing unit and a signal output from the mode determination unit; and a switching unit for switching On and Off according to the operation of the switching controller to enable transmission of power converted by the first power converter to the output power supply unit.

BRIEF DESCRIPTION OF THE DRAWINGS

The accompanying drawings illustrate preferred aspects of the present invention and are a part of the specification. Together with the following description, the drawings demonstrate and explain the principles of the present invention. The illustrated aspects are examples of the present invention and do not limit the scope of the invention.

Throughout the drawings, identical reference numbers designate similar, but not necessarily identical, elements.

DETAILED DESCRIPTION OF THE INVENTION

The following description provides specific details in order to provide a thorough understanding of the invention. The skilled artisan, however, would understand that the invention can be practiced without employing these specific details. Indeed, the present invention can be practiced by modifying the illustrated system and method and can be used in conjunction with apparatus and techniques conventionally used in the industry.

Figure 5:
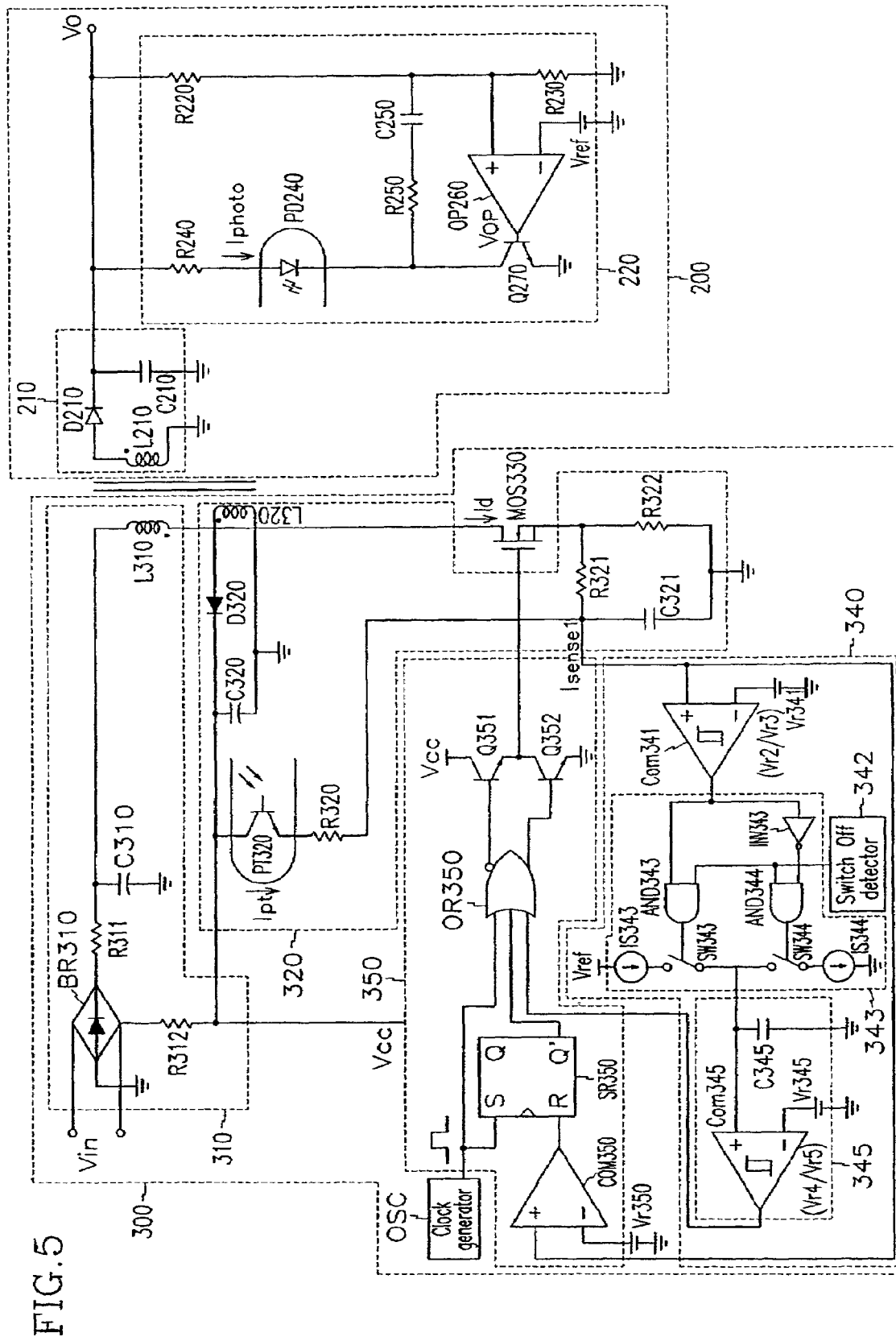
FIG. 5 is a block diagram of a switched-mode power supply supporting burst-mode operation according to a first preferred aspect of the present invention.

With reference to FIG. 5, a switched-mode power supply for providing an output power to a load and supporting burst-mode operation according to a first aspect of the present invention includes a first power supply unit (300) for receiving an input power (Vin) and rectifying the same, and, according to a level of an output power for the load, distinguishes between a normal mode and a burst mode, and performs switching according to a timing corresponding to each of the modes to provide a first power; and an output power supply unit (200) that receives the first power output by the first power supply unit (300) according to a coil winding ratio, and generates an output power for driving the load.

The first power supply unit (300) includes a first power converter (310) for receiving the input power (Vin), rectifying the same, then outputting a resulting power; an output power sensing unit (320) for sensing the output power (Vo) that is output to the load from the output power supply unit (200) and outputting a corresponding signal; a mode determination unit (340) for determining when conditions for operation in a burst mode are satisfied, the mode determination unit (340) performing this operation using a level of the signal output by the output power sensing unit (320); a switching controller (350) for outputting a signal to control timing of the switch according to the signal output from the output power sensing unit (320) and a signal output from the mode determination unit (340); and a switching transistor (MOS330) for switching On and Off to enable transmission of power converted in the first power converter (310) to the output power supply unit (200).

The first power converter (310) includes a bridge circuit (BR310) that receives the input power (Vin), performs wave rectification of the same, then outputs a resulting power; a first resistor (R311), with a first terminal connected to an output terminal of the bridge circuit (BR310); a capacitor (C310), with a first terminal connected to a second terminal of said first resistor (R311), and a second terminal which is grounded; a first coil (L310), with a first terminal connected to the second terminal of said first resistor (R311), and a second terminal which is connected to a drain of the switching transistor (MOS330); and a second resistor (R312), with a first terminal connected to the output terminal of the bridge circuit (BR310).

The output power sensing unit (320) includes a phototransistor (PT320) for receiving, through a base thereof, an output power that is sensed and undergoes feedback from the output power supply unit (200), the phototransistor (PT320) receiving the output power as a light signal; a first capacitor (C320), with a first terminal connected to a collector of said phototransistor (PT320), and a second terminal which is grounded; a diode (D320), with a cathode connected to the collector of said phototransistor (PT320); a power sensing coil (L320), with a first terminal connected to an anode of said diode (D320), and a second terminal which is grounded, the power sensing coil (L320) being connected in parallel to the first coil (L310) of the first power converter (310); a first resistor (R320), with a first terminal connected to an emitter of said phototransistor (PT320); a second capacitor (C321), with a first terminal connected to the second terminal of said first resistor (R320), and a second terminal which is grounded; a second resistor (R321), with a first terminal connected to the second terminal of said first resistor (R320), and a second terminal connected to the source of the switching transistor (MOS330); and a third resistor (R322), with a first terminal connected to the source of the switching transistor (MOS330), and a second terminal which is grounded.

The mode determination unit (340) includes a first comparator (Com341) for determining if conditions for burst-mode operation are satisfied, and outputting a corresponding sensing signal, the first comparator (Com341) performing this operation using the signal sensed in the output power sensing unit (320); a switch Off detector (342) for detecting a basic Off position of the switching transistor (MOS330); a burst signal regulating unit (343) for receiving the burst mode sensing signal output from the first comparator (Com341) and adjusting the burst mode sensing signal so that it corresponds to a signal output from the switch Off detector (342), after which the burst signal regulating unit (343) outputs the burst mode sensing signal; and a burst controller (345) for receiving the signal output from the burst signal regulating unit (343) and outputting a signal to the switching controller (350) to enable control into the burst mode when the burst mode sensing signal is maintained for a predetermined duration.

The first comparator (Com341) of the mode determination unit (340) receives the signal sensed in the output power sensing unit (320) through a non-inverting input terminal, and receives through an inverting input terminal a first reference voltage (Vr341) of a predetermined value having a second reference value (Vr2) and a third reference value (Vr3).

When the output signal of the first comparator (Com341) is On, the voltage value of the first reference voltage (Vr341) becomes the second reference value (Vr2), while if the output signal of the first comparator (Com341) is Off, the voltage value of the first reference voltage (Vr341) becomes the third reference value (Vr3).

The burst signal regulating unit (343) of the mode determination unit (340) includes a first AND gate (AND343) for performing a logical AND operation of the output signal of the first comparator (Com343) and the output signal of the switch Off detector (342), and outputting a resulting signal; an inverter (INV343) for inverting the output signal of the first comparator (Com341) and outputting a resulting signal; a second AND gate (AND344) for performing a logical AND operation of the output signal of the inverter (INV343) and the output signal of the switch Off detector (342), and outputting a resulting signal; a first switch (SW343) that opens and closes according to the output signal of the first AND gate (AND343) to apply a predetermined power (Vref) to the burst controller (345); and a second switch (SW344) that opens and closes according to the output signal of the second AND gate (AND344) to ground the burst controller (345).

The burst controller (345) of the mode determination unit (340) includes a capacitor (C345), with a first terminal which receives the output signal of the burst signal regulating unit (343), and a second terminal which is grounded; and a second comparator (Com345), with a non-inverting input terminal which receives the output signal of the burst signal regulating unit (343) through the capacitor (C345), and an inverting terminal which receives a second reference voltage (Vr345) of a predetermined value having a fourth reference value (Vr4) and a fifth reference value (Vr5).

When the output signal of the second comparator (Com345) is On, the voltage value of the second reference voltage (Vr345) becomes the fourth reference value (Vr4), while if the output signal of the second comparator (Com345) is Off, the voltage value of the second reference voltage (Vr345) becomes the fifth reference value (Vr5).

The switching controller (350) includes a comparator (COM350), with a non-inverting terminal which receives the signal sensed in the output power sensing unit (320), and an inverting terminal which receives a first reference voltage (Vr350) of a first reference value; a flip-flop (SR350), with a reset terminal connected to an output terminal of the comparator (COM350), and a set terminal which receives a clock signal; an OR gate (OR350), with a first input terminal connected to an inverted output terminal of the flip-flop (SR350), a second input terminal which receives the clock signal, and a third input terminal which receives the output signal of the mode determination unit (340); a first transistor (Q351), with a collector connected to a drive power source (Vcc), a base connected to an inverted output terminal of the OR gate (OR350), and an emitter connected to a gate of the switching transistor (MOS 330); and a second transistor (Q352), with a base connected to a non-inverted output terminal of the OR gate (OR350), and a collector connected to the gate of the switching transistor (MOS330).

The output power supply unit (200) includes an output power generating unit (210) that receives the power output from the first power supply unit (300) and generates a power for driving a load; and an output power feedback unit (220) for sensing the power generated by and output from the output power generating unit (210) and performing feedback of the power to the first power supply unit (300).

The output power generating unit (210) of the output power supply unit (200) includes a second coil (L210) for receiving the power applied from the first power supply unit (300) through an induced current; a diode (D210), with an anode connected to a first terminal of the second coil (L210) (a second terminal of the second coil (L210) being grounded); and a capacitor (C210), with a first terminal connected to a cathode of said diode (D210), and a second terminal which is grounded.

The output power feedback unit (220) of the output power supply unit (200) includes a first resistor (R220), with a first terminal which receives the output power of the output power generating unit (210); a second resistor (R230), with a first terminal connected to a second terminal of said first resistor (R220), and a second terminal which is grounded; an operational amplifier (OP260), with an inverting terminal connected to the second terminal of said first resistor (R220), and a non-inverting terminal which receives a reference voltage; a transistor (Q270), with a base connected to an output terminal of the operational amplifier (OP260), and an emitter which is grounded; a capacitor (C250), with a first terminal connected to the second terminal of said first resistor (R220); a fourth resistor (R250), with a first terminal connected to a second terminal of said capacitor (C250), and a second terminal connected to a collector of said transistor (Q270); a third resistor (R240), with a first terminal which receives an output power of the output power generating unit (210); and a photodiode (PD240), with an anode connected to a second terminal of the third resistor (R240), and a cathode connected to the collector of said transistor (Q270) to emit a light proportional to an amount of a current passing through the photodiode (PD240) for output to the first power supply unit (300).

The switching transistor (MOS330) is a general MOSFET (metal oxide semiconductor field effect transistor). The switched-mode power supply supporting burst-mode operates in the following manner. In order to supply a stable power to electronics devices such as televisions, computer monitors, and VCRs, the first power supply unit (300) receives the input power (Vin) and generates a power of a suitable level. This power is output through the first coil (L110) by the switching operation of the switching transistor (MOS330).

The output power supply unit (200) receives the power by induction through the second coil (L210), which opposes the first coil (L110), then provides a power required to drive an electronic device acting as a load. The power applied from the first power supply unit (300) and the power supplied to the load are adjusted by the charging and discharging of the capacitor (C210).

Normal operation of the switched-mode power supply occurs in the following manner. In order to control the On and Off operation of the switching transistor (MOS330), which regulates the power applied to the output power supply unit (200), the first power supply unit (300) senses the level of the output power (Vo) that is supplied to the load from the output power supply unit (200), and receives feedback of the output power (Vo). That is, with respect to sensing the level of the output power (Vo) in the output power supply unit (200) and performing feedback of the power, the transmission of the feedback signal is performed by a photo coupler, which is realized by the photodiode (PD240) and the phototransistor (PT320) of the first power supply unit (300).

That is, the feedback operation of the output power (Vo) is performed as follows. Part of the output power (Vo) inverted in the capacitor (C210) of the output power generating unit (210) is detected by a resistance ratio between the first resistor (R220) and the second resistor (R230) of the feedback unit (220), then this value is compared in the operational amplifier (OP260) with a pre-installed reference voltage (Vref), after which a corresponding voltage signal is output.

Accordingly, a current ($I_{photo}$) flowing to the photodiode (PD240) is determined. The photodiode (PD240) then emits a corresponding amount of light, which is sensed in the phototransistor (PT320) of the output power sensing unit (320) by passing through the base of the phototransistor (PT320). As a result, a current (Ipt) of an amount corresponding to the amount of light sensed by the phototransistor (PT320) is generated, after which the current (Ipt) flows to the second resistor (R321) through the first resistor (R320). A resulting voltage drop $V_{R321}$ across the second resistor (R321) is combined with a voltage $V_{R322}$ of the third resistor (R322) such that an output value of the comparator (COM350) varies according to the voltage drop $V_{R321}$ across the second resistor (R321).

Further, the second resistor (R321) and the second capacitor (C321) turns On the switching transistor (MOS330) to thereby operate as a filter circuit for preventing noise occurring as a result of a surge current. That is, if the output value of the comparator (COM350) is a logical HIGH value, the flip-flop (SR350) is reset such that the output value of the non-inverting terminal of the OR gate (OR350) becomes LOW and the output value of the inverting terminal of the OR gate (OR350) becomes HIGH.

Figure 1:
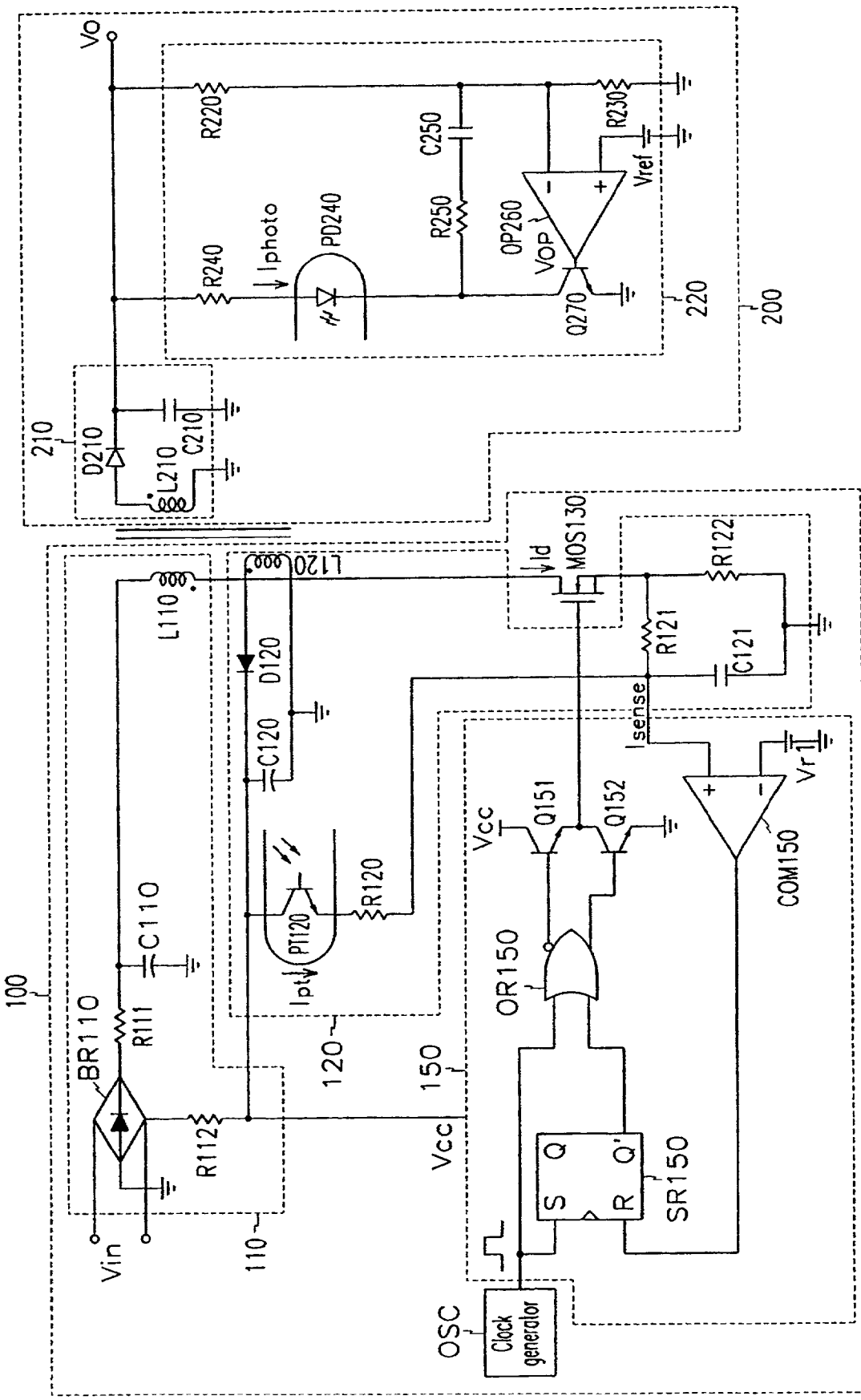
FIG. 1 is a block diagram of a conventional switched-mode power supply.
Figure 2:
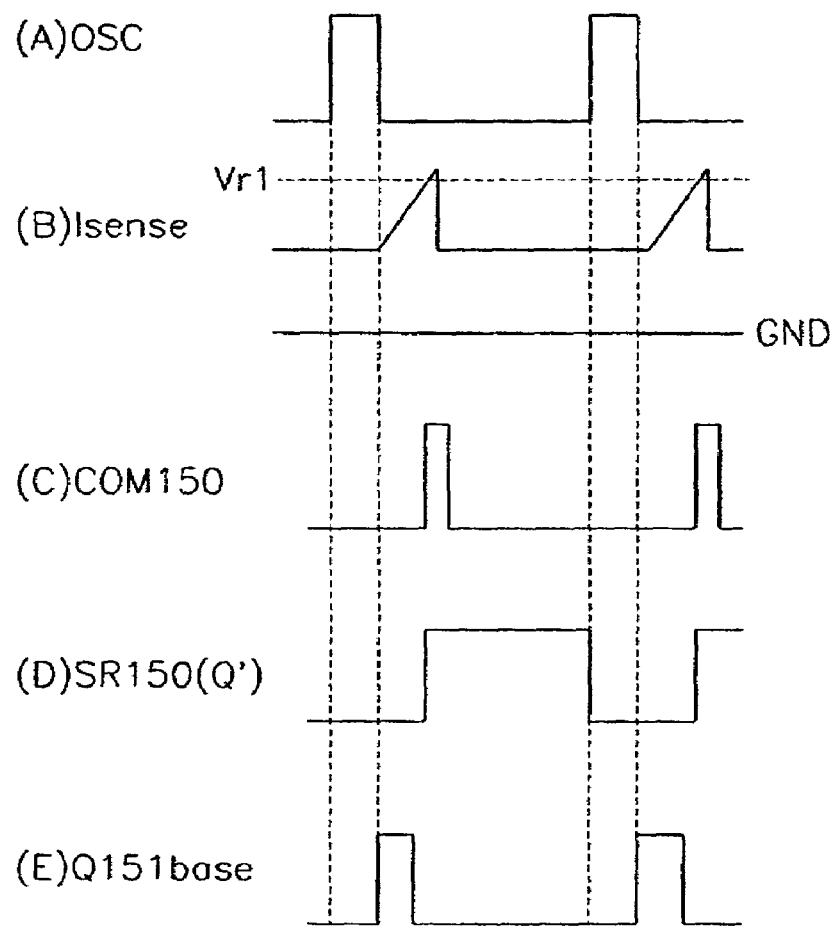
FIG. 2 is a signal waveform diagram of various elements of FIG. 1.
Figure 6:
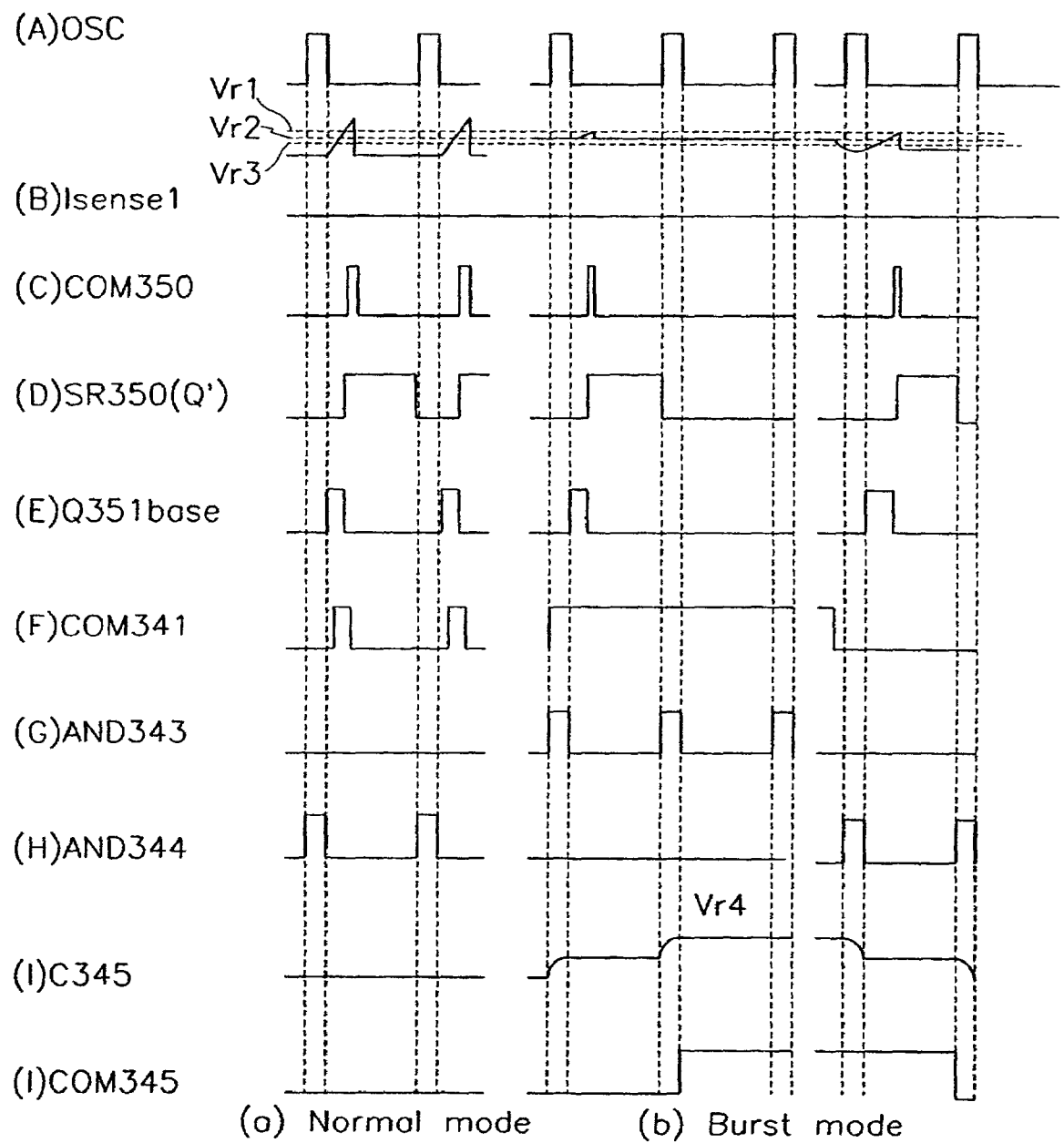
FIG. 6 is a signal waveform diagram of various elements of FIG. 5.

The value of the output signal of the OR gate (OR350) is determined by an output signal of a clock generator (OSC) as shown in A of FIG. 6, and by the value of the inverting output terminal of the flip-flop (SR350) as shown in D of FIG. 6. Further, the value of the inverting output terminal of the flip-flop (SR350) is determined by the output signal of the comparator (COM350) as shown in C of FIG. 6, the output signal of the comparator (COM350) is determined by a current (Isensel) input to the non-inverting input terminal of the comparator (COM350) as shown in B of FIG. 2, and an offset voltage is determined by the value of the current (Isensel). And the value of the inverting output terminal of the OR gate (OR350) input to the base of the first transistor (Q351) is opposite the output signal of the inverting output terminal of the flip-flop (SR350).

In addition, if the second transistor (Q352) is turned On, the switching transistor (MOS330) is turned Off such that power transmission does not occur. However, if the first transistor (Q351) is turned On, the switching transistor (MOS330) is turned On such that a first power is transmitted to the output power supply unit (200).

In summary, if the output power (Vo) is increased, the amount of the current ($I_{photo}$) flowing to the photodiode (PD240) is increased, and at the same time, the current (Ipt) flowing to the phototransistor (PT320) is also increased. Accordingly, the voltage drop across the second resistor (R321) is increased, and a DC offset voltage rises, resulting in a reduction in the On time of the switching transistor (MOS330).

If the On time of the switching transistor (MOS330) is reduced, the power transmitted to the output power supply unit (200) is reduced, and the time that the capacitor (C210) of the output power generating unit (210) is charged is reduced. This ultimately results in a reduction of the output power (Vo).

If the power consumption of the load increases such that the output power (Vo) decreases, the switched-mode power supply of the first aspect of the present invention operates oppositely from that of the above. That is, the current ($I_{photo}$) flowing to the photodiode (PD240) is reduced, and the current (Ipt) flowing to the phototransistor (PT120) is reduced.

Accordingly, the voltage drop across the second resistor (R321) decreases such that a reduction in the DC offset voltage occurs. As a result, the On time of the switching transistor (MOS330) is increased.

If the On time of the switching transistor (MOS330) is increased, the power transmitted to the output power supply unit (200) is increased, and the time that the capacitor (C210) of the output power generating unit (210) is charged is extended. This ultimately results in an increase of the output power (Vo) to supply a power sufficient to drive the load.

Figure 3:
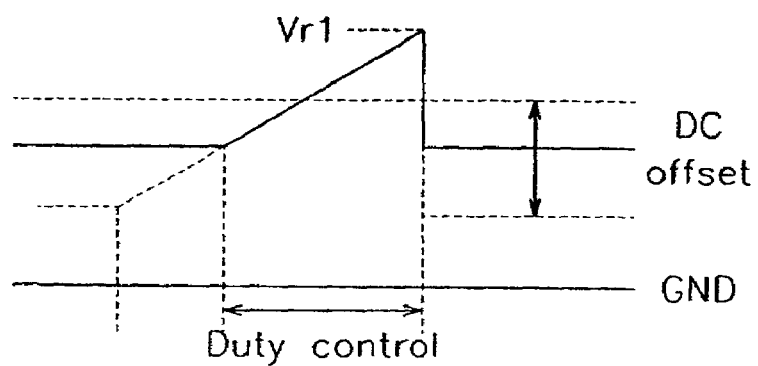
FIG. 3 is a waveform diagram illustrating offset duty control.
Figure 4:
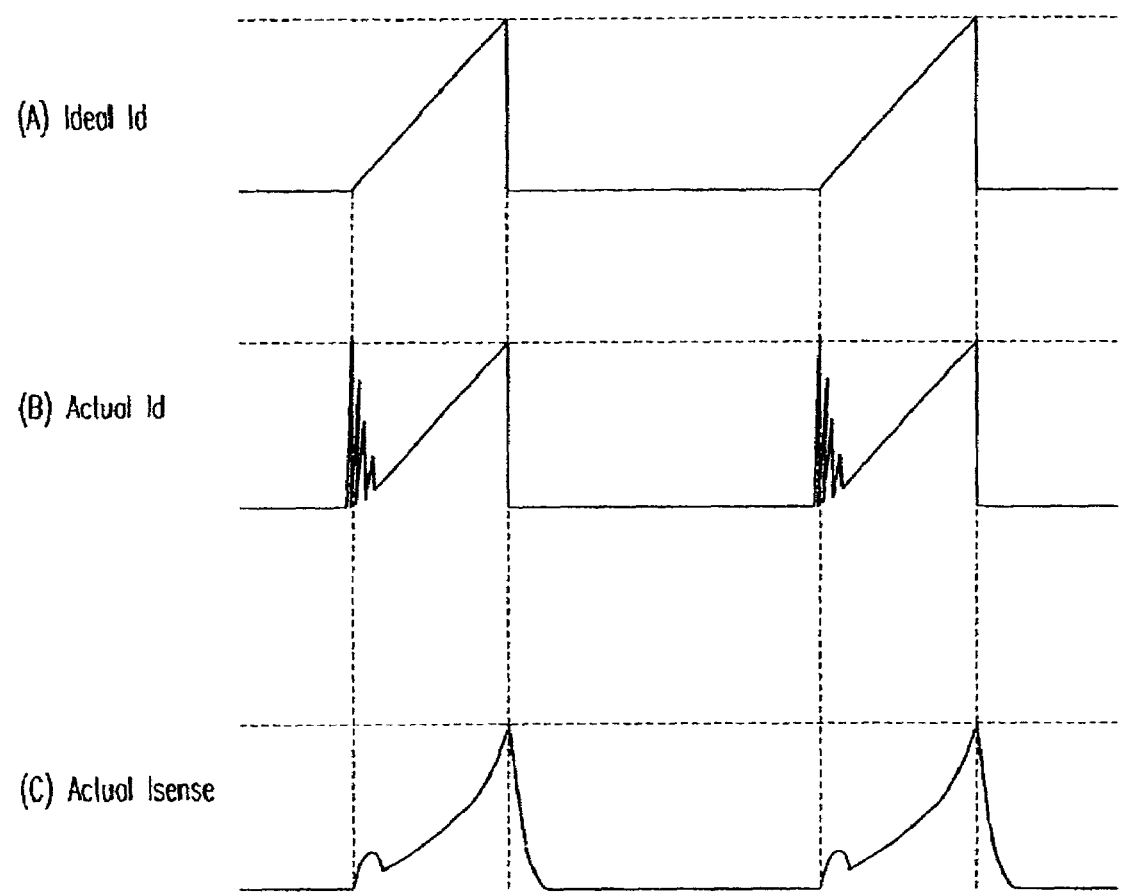
FIG. 4 is a drawing showing an ideal current waveform and an actual current waveform for currents operating in the power supply of FIG. 1.

The relation between the DC offset voltage and the drain current of the switching transistor (MOS330) is described in reference to FIG. 3. The DC offset voltage varies in the range shown by the vertical arrow of FIG. 3. A decrease in the power demand of the load increases the output power (Vo) such that the current flowing to the photo coupler increases to raise the offset voltage. This results in an increase in the offset voltage to an upper limit, that is, to an upper end of the vertical arrow. Therefore, duty control is realized for a time duration during which the signal appears at the uppermost dotted line in FIG. 3. The switching transistor (MOS330) is On for a corresponding amount of time to transmit power.

On the other hand, when there is an increase in the power demand of the load to decrease the output power (Vo), the current flowing to the photo coupler decreases to reduce the offset voltage, and this results in a decrease in the offset voltage to a lower limit, that is, to a lower end of the vertical arrow of FIG. 3, duty control is realized for at time duration during which the signal appears at the lowermost dotted line in FIG. 3, and accordingly, the switching transistor (MOS330) is On for a corresponding amount of time to transmit power.

When the offset voltage is generated during the normal range, the output signal of the mode determination unit (340) is maintained in a LOW state. That is, the first comparator (Com341) compares the offset voltage and the second reference value (Vr2) of the first reference voltage (Vr341). If the offset voltage applied to the non-inverting terminal is within a predetermined range, that is, less than or equal to the third reference value (Vr3) of the first reference voltage (Vr341) of the first comparator (Com341), operation as in the normal mode portion (a) of B in FIG. 6 is performed.

The first comparator (Com341) is a comparator for performing a hysteresis operation. In a state where the output of the first comparator (Com341) is LOW, the value of the inverting input terminal becomes the second reference value (Vr2), and if the voltage of the signal input to the non-inverting input terminal becomes greater than or equal to the second reference value (Vr2), the output of the first comparator (Com341) converts to a HIGH signal.

However, in a state where the output of the first comparator (Com341) is HIGH, the first reference voltage (Vr341) of the inverting input terminal becomes a third reference voltage (Vr3), and even if the voltage of the signal input to the non-inverting terminal falls to a level at or below the second reference value (Vr2), the output of the first comparator (Com341) does not change to LOW.

The voltage of the signal input to the non-inverting input terminal of the first comparator (Com341) must become less than or equal to the third reference value (Vr3) before the output of the first comparator (Com341) changes to LOW. This prevents arbitrary changes and enables stable operation with variations in the input signal, and also prevents mis-operation as a result of noise.

During normal operation, the output signal of the first comparator (Com341) appears as a pulse after a predetermined time subsequent to the trailing edges of the output signal of the clock generator as shown in the normal mode portion (a) of F in FIG. 6. Further, since the output signal of the first AND gate (AND343) is the result of performing a logical AND operation of the output signal of the first comparator (Com341) and the output signal of the switch Off detector (342), the output signal of the first AND gate (AND343) is maintained in a LOW state as shown in the normal mode portion (a) of G in FIG. 6.

Further, since the output signal of the second AND gate (AND344) is the result of performing a logical AND operation of the output signal of the first comparator (Com341) (after it is inverted) and the output signal of the switch Off detector (342), the output signal of the second AND gate (AND344) results in a pulse identical to the signal of the clock generator (OSC) as shown in the normal mode portion (a) of H in FIG. 6.

The output signal of the clock generator (OSC) may be used as the output value of the switch Off detector (342). Accordingly, the first switch (SW343) is opened and closed according to the output signal of the first AND gate (AND343) such that it is continuously maintained in an opened state. Further, since the second switch (SW344) is opened and closed according to the output signal of the second AND gate (AND344), the second switch (SW344) is closed every time the output signal of the clock generator (OSC) changes to HIGH.

As a result, the non-inverted input terminal of the second comparator (Com345) of the burst controller (345) is grounded, and the charge stored in the capacitor (C345) is discharged. In the case where there is no charge in the capacitor (C345), the voltage of the capacitor (C345) is maintained in a grounded state as shown in the normal mode portion (a) of I in FIG. 6. Further, since the non-inverted input terminal of the second comparator (Com345) is as if it is grounded, the output value of the second comparator (Com345) is maintained in a LOW state as shown in the normal mode portion (a) of J in FIG. 6. The second comparator (Com345) performs a hysteresis operation as with the first comparator (Com341), and has the same object of providing a stable operation and preventing mis-operation as a result of noise.

As described above, when the consumption of power by an electronic device acting as a load is maintained at or above a predetermined value, when the value of the output power (Vo) is maintained within a predetermined range, and when the offset voltage is less than or equal to the third reference voltage (Vr3) of the first comparator (Com341), the output voltage of the mode determination unit (340) is maintained in a LOW state, and the entire circuit is controlled to operate in the normal mode. However, if the power demand of the load is extremely small and the offset voltage is less than the third reference value of the first reference voltage (Vr341) of the first comparator (Com341), it is determined by the mode determination unit (340) that operation in the burst mode is required, and the output value is maintained in a HIGH mode.

A burst-mode operation of the switched-mode power supply according to the first aspect of the present invention is described reference to FIG. 5 and the burst mode portion (b) of FIG. 6. If an electronics device is operated in the stand-by mode or cut-off mode such that the power consumption is extremely low, the output power (Vo) increases with the decrease in the power consumption. As a result, the offset voltage increases.

However, as shown in the burst mode portion (b) of FIG. 6, if the offset voltage increases to a level that is at or higher than the third reference value of the first comparator (Com341), the output value of the first comparator (Com341) continues to be maintained in a HIGH state. That is, at the instant the signal input to the non-inverted input terminal of the first comparator (Com341) increases to greater than or equal to the second reference value, the output signal of the first comparator (Com341) converts to HIGH.

Further, even if the input signal of the non-inverted input terminal of the first comparator (Com341) is reduced, a minimum value maintains the offset voltage. Since the offset voltage is set at a level greater than the third reference value of the first reference voltage (Vr341), the output value does not change to a LOW state and is maintained as a HIGH signal as shown in the burst mode portion (b) of F in FIG. 6.

However, since the output value of the first AND gate (AND343) is determined according to the output value of the first comparator (Com341) and the output value of the clock generator (OSC), i.e., the Switch Off detector, the output value of the first AND gate (AND343) appears as a pulse that corresponds to the burst mode portion (b) of G in FIG. 6.

Further, the output value of the second AND gate (AND344) is maintained in a LOW state as shown in the burst mode portion (b) of H in FIG. 6. The first switch (SW343) is closed matching the clock frequency according to the output signal of the first AND gate (AND343). Accordingly, the capacitor (C345) is slowly charged using a predetermined power to result as shown in the burst mode portion (b) of I in FIG. 6.

At the instant the charge value of the capacitor (C345) becomes greater than or equal to the fourth reference value (Vr4) of the second reference voltage (Vr345), the output value of the second comparator (Com345) converts to a HIGH state as shown in the burst mode portion (b) of J in FIG. 6. As well, the instant the output value of the second comparator (Com345) converts to a HIGH value, the OR gate (OR350) of the switching controller (350) produces a HIGH output signal, regardless of the states of the other input signals. Accordingly, the signal applied to the base of the transistor (Q351) is maintained in a LOW state as shown in the burst mode portion (b) of E in FIG. 6 and the signal applied to the base of the transistor (Q352) is maintained in a HIGH state, thereby discontinuing the switching operation of the switching transistor (MOS330).

The switching operation of the switching transistor (MOS330) is discontinued until the offset voltage falls to or below the third reference value (Vr3) of the first reference voltage (Vr341). With the termination in the switching operation of the switching transistor (MOS330), the charge in the capacitor (C210) of the output power generating unit (210) is continuously used by the load. As a result, if the offset voltage falls to or below the third reference value (Vr3) of the first reference voltage (Vr341), the output value of the first comparator (Com341) converts to a LOW state as shown in the burst mode portion (b) of F in FIG. 6.

Further, the output value of the first AND gate (AND343) converts to a permanent LOW state, and the output value of the second AND gate (AND344) outputs a HIGH signal while matching the timing of the clock signal. Accordingly, the first switch (SW343) continues to remain open and the second switch (SW344) intermittently closes such that the capacitor (C345) of the burst controller (345) discharges as shown in the rearward area of the burst mode portion (b) of I in FIG. 6.

With the discharge of the capacitor (C345) of the burst controller (345), there is a drop in the input voltage of the non-inverting terminal of the second comparator (Com345). At the instant the value of this voltage falls to or below the fifth reference value (Vr5) of the second reference voltage (Vr345), the output value of the second comparator (Com345) converts to a LOW state as shown in the rearward area of the burst mode portion (b) of J in FIG. 6. Subsequently, the switching controller (350) operates in the normal mode to perform switching of the switching transistor (MOS330).

If the offset voltage increases during normal-mode operation, operation in the burst mode is again effected. Also, a decrease in the offset voltage during burst-mode operation again results in the transition into the normal mode. This is repeated as needed.

As a result of the above operation, if the load utilizes an extremely small amount of power, operation in the burst mode is effected and the switching operation is minimized. Therefore, power consumption is reduced, and even during switching operations, abrupt switching is avoided such that stable circuit operation is realized.

Figure 7:
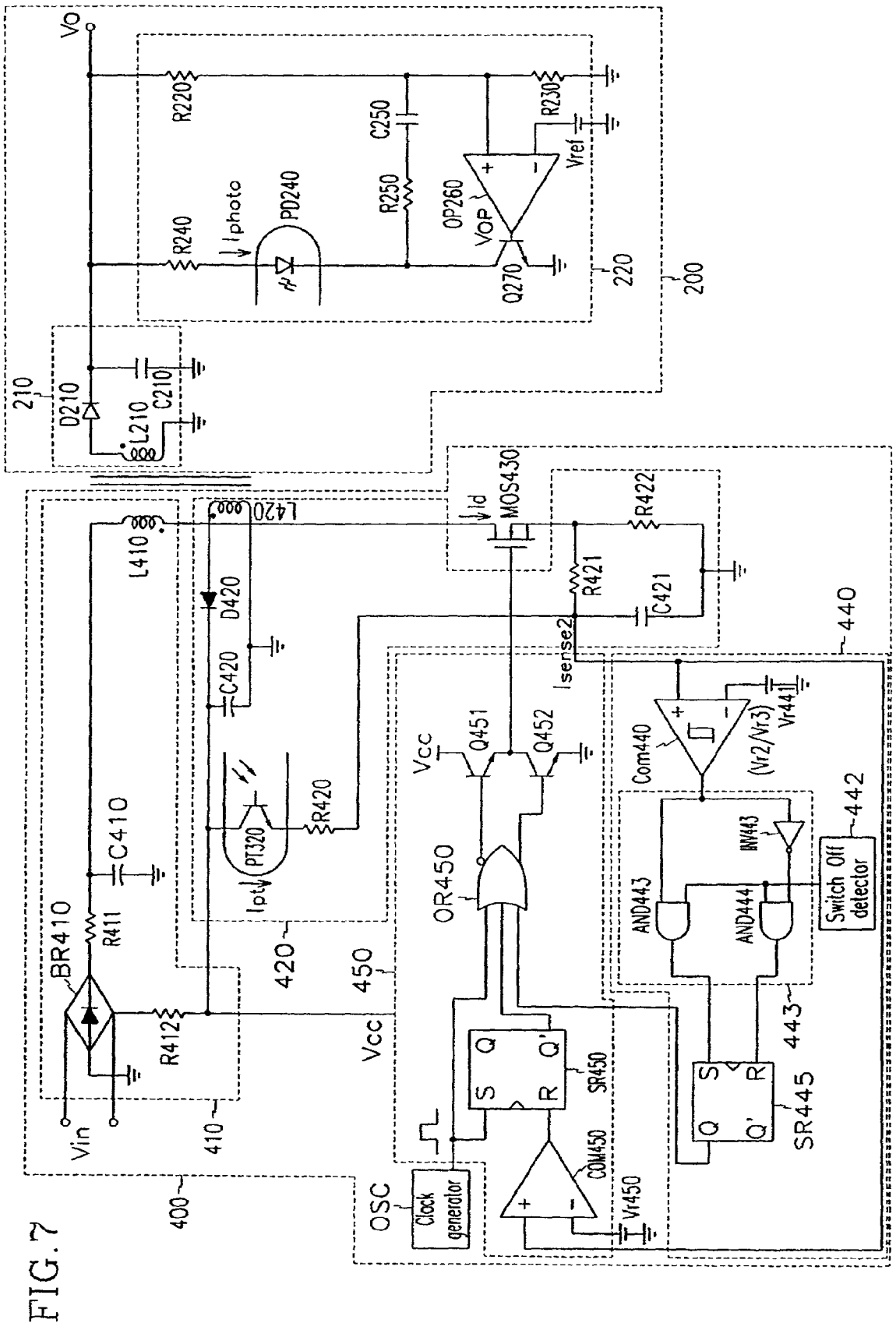
FIG. 7 is a block diagram of a switched-mode power supply supporting burst-mode operation according to a second preferred aspect of the present invention.

An example in which a flip-flop is used instead of the second comparator (Com345) to perform the function of the mode determination unit (340) is described with reference to FIG. 7. FIG. 7 shows a block diagram of a switched-mode power supply supporting burst-mode operation according to a second aspect of the present invention.

In FIG. 7, a switched-mode power supply for providing an output power to a load and supporting burst-mode operation includes a second power supply unit (400) for receiving an input power (Vin) and rectifying the same, and, according to a level of an output power for the load, distinguishes between a normal mode and a burst mode, and performs switching according to a timing corresponding to each of the modes to provide a first power; and an output power supply unit (200) that receives the first power output by the first power supply unit (400) according to a coil winding ratio, and generates an output power for driving the load.

The first power supply unit (400) includes a first power converter (410) for receiving the input power (Vin), rectifying the same, then outputting a resulting power; an output power sensing unit (420) for sensing the output power (Vo) that is output to the load from the output power supply unit (200) and outputting a corresponding signal; a mode determination unit (440) for determining when conditions for operation in a burst mode are satisfied, the mode determination unit (440) performing this operation using a level of the signal output by the output power sensing unit (420); a switching controller (450) for outputting a signal to control timing of the switch according to the signal output from the output power sensing unit (420) and a signal output from the mode determination unit (440); and a switching transistor (MOS430) for switching On and Off to enable transmission of power converted in the first power converter (410) to the output power supply unit (200).

The structures of the first power converter (410), the output power sensing unit (420), and the switching controller (450) are identical to the structures of the first power converter (310), the output power sensing unit (320), and the switching controller (350) of the first aspect of the present invention. Therefore, a detailed description thereof will not be provided.

The mode determination unit (440) includes a variable comparator (Com440) for determining if conditions for burst-mode operation are satisfied, and outputting a corresponding sensing signal, the variable comparator (Com440) performing this operation using the signal sensed in the output power sensing unit (420); a switch Off detector (442) for detecting a basic Off position of the switching transistor (MOS430); a burst signal regulating unit (443) for receiving the burst mode sensing signal output from the variable comparator (Com440) and adjusting the burst mode sensing signal so that it corresponds to a signal output from the switch Off detector (442), after which the burst signal regulating unit (443) outputs the burst mode sensing signal; and a flip-flop (SR445) for latching a signal corresponding to the signal output from the burst signal regulating unit (443), then outputting this signal to the switching controller (450). The variable comparator (Com440) of the mode determination unit (440) is structured and operates identically to the first comparator (Com341) of the first aspect of the present invention.

The burst signal regulating unit (443) of the mode determination unit (440) includes a first AND gate (AND443) for performing a logical AND operation of the output signal of the variable comparator (Com440) and the output signal of the switch Off detector (442), and outputting a resulting signal; an inverter (INV443) for inverting the output signal of the variable comparator (Com440) and outputting a resulting signal to a set terminal of the flip-flop (SR445); a second AND gate (AND444) for performing a logical AND operation of the output signal of the inverter (INV443) and the output signal of the switch Off detector (442), and outputting a resulting signal to a reset terminal of the flip-flop (SR445). The structure of the output power supply unit (200) is identical to that of the first aspect of the present invention.

The switched-mode power supply supporting burst-mode in the second aspect of the invention operates in the following manner. In a normal state, that is, in a state where an electronic device for receiving power as a load operates normally to consume a power that is equal to or greater than a predetermined level, the output signal of the variable comparator (Com440) is an intermittent pulse as shown in the normal mode portion (a) of F in FIG. 8. Accordingly, the output signal of the first AND gate (AND443) is maintained in a LOW state, and the output signal of the second AND gate (AND444) appears as a periodic pulse like the clock signal. As a result, the flip-flop (SR445) is continuously reset to output a LOW signal as shown in the normal mode portion (a) of I in FIG. 8.

Therefore, the output signal of the mode determination unit (440) is low in the normal mode. Such operation is determined by elements other than the mode determination unit (440). Power is supplied by charging the capacitor (C210) of the output power generating unit (210) according to the opening of the switching transistor (MOS430), which occurs in time with the period of the clock signal. Thus, this operation is identical to that in the first aspect of the present invention.

However, if the level of power used by the load is extremely low, the offset voltage increases to greater than the third voltage (Vr3) of the variable comparator (Com440), and the output signal of the variable comparator (Com440) converts to HIGH and is maintained in this state. Accordingly, the first AND gate (AND443) outputs a HIGH signal timed with the period of the clock signal, while the second AND gate (AND444) maintains its output signal in a LOW state. As a result, the flip-flop (SR445) is continuously set to maintain a HIGH output as shown in the burst mode portion (b) of I in FIG. 8.

With the output value of the flip-flop (SR445) maintained at HIGH, the output value of the OR gate (OR450) of the switching controller (450) is maintained in a HIGH state, and the second transistor (Q452) is turned on such that the switching operation of the switching transistor (MOS430) is discontinued. Therefore, the charge accumulated in the capacitor (C210) of the output power generating unit (210) is slowly used by the load, and charging of the capacitor (C210) does not occur.

Figure 8:
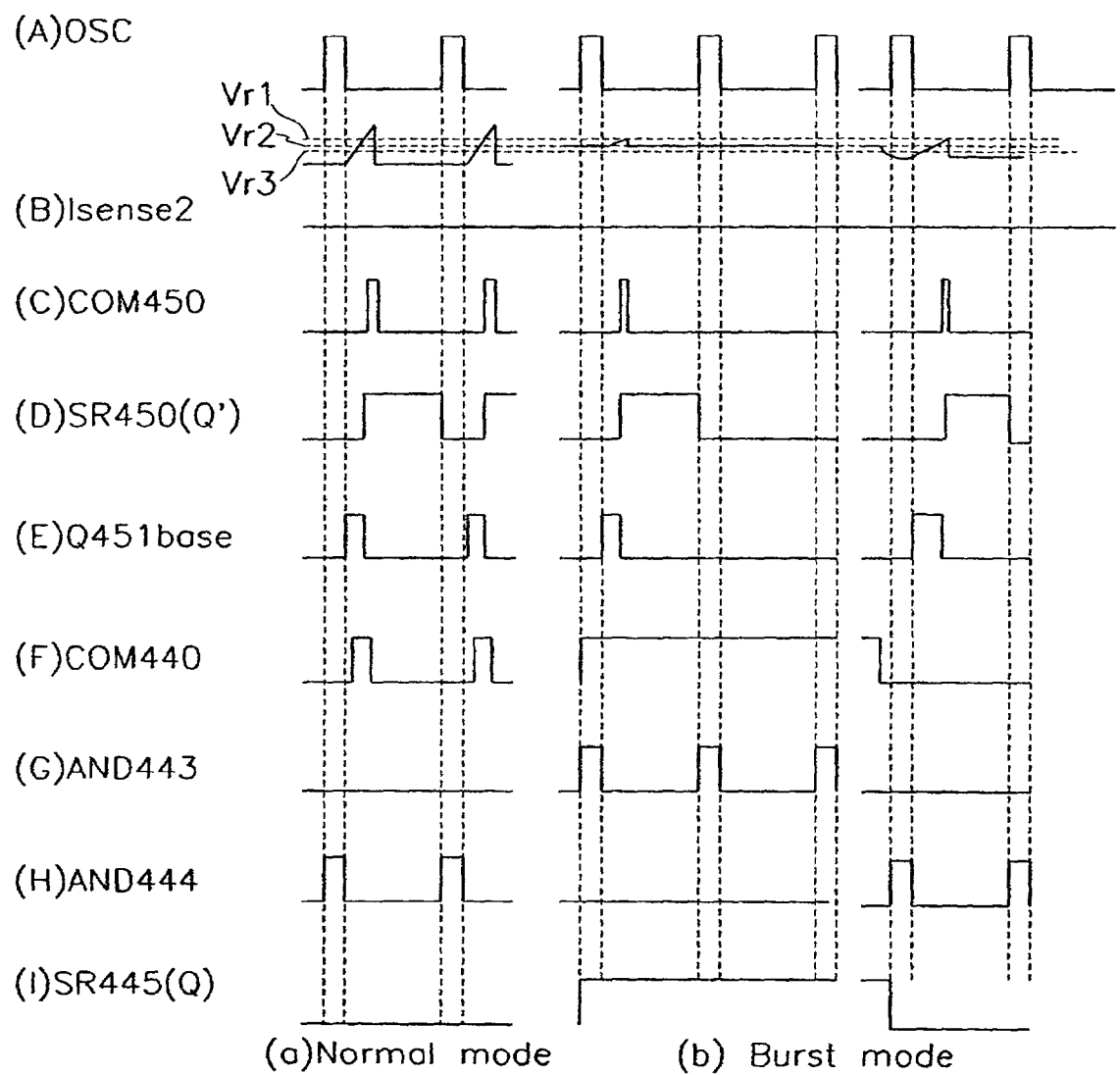
FIG. 8 is a signal waveform diagram of various elements of FIG. 7.

With the discharging of the capacitor (C210), the voltage of the output power (Vo) decreases, and at the instant the offset voltage falls to at or below the third reference value of the variable comparator (Com440), the output value of the variable comparator (Com440) converts to LOW as shown in the rearward area of the burst mode portion (b) of F in FIG. 8. Further, the output value of the first AND gate (AND443) changes to LOW, and the second AND gate (AND444) outputs a HIGH signal in unison with the clock signal. Therefore, the flip-flop (SR445) is intermittently reset such that the output value of the flip-flop (SR445) is maintained in a LOW state, thereby effecting operation again in the normal mode.

If the offset voltage increases during normal-mode operation, control for operation in the burst mode is again performed. Also, a decrease in the offset voltage during burst-mode operation again results in the transition into the normal mode. This is repeated as needed.

Thus, in the switched-mode power supply according to the second aspect of the present invention, if the power consumption by the load is greater than or equal to a predetermined level, power is supplied by the periodic switching operation. However, if the load utilizes an extremely small amount of power, operation in the burst mode is effected and the switching operation is maintained at a minimum level. Hence, there is a minimization in the level of unnecessary power consumption occurring because of switching when power demand levels are low.

As a result, when an electronic device that receives power from the switched-mode power supply demands a low level of power, burst-mode operation is effected to reduce switching loss. Further, if the size of the load is extremely small, mis-operation does not occur and suitable power supply control is realized.

Although preferred aspects of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

We claim:

1. A switched-mode power supply supporting burst-mode operation, in which the power supply provides an output power to a load, the power supply comprising:
   a first power supply unit for receiving an input power and rectifying the power, and, according to a level of an output for the load, distinguishing between a normal mode and a burst mode to perform switching according to a timing corresponding to one of the normal mode or the burst mode to supply a first power; and
   an output power supply unit for receiving the first power from the first power supply unit according to a winding ratio of a coil to generate an output power for driving the load;
   wherein the first power supply unit comprises:
   a first power converter for receiving the input power, rectifying the input power, then outputting a resulting power;
   an output power sensing unit for sensing the output power that is output to the load from the output power supply unit and outputting a corresponding signal;
   a mode determination unit for determining when conditions for operation in a burst mode are satisfied, the mode determination unit performing this operation using a level of the signal output by the output power sensing unit, and the mode determination unit generating and outputting a corresponding control signal;
   a switching controller for outputting a signal to control timing of the switch, including both extended and shortened time intervals, according to the signal output from the output power sensing unit and a signal output from the mode determination unit; and
   a switching unit for switching On and Off according to the operation of the switching controller to enable transmission of power converted by the first power converter to the output power supply unit.

2. The power supply of claim 1, wherein the output power sensing unit comprises a phototransistor for receiving as a light signal and through a base thereof, an output power that is sensed and undergoes feedback from the output power supply unit.

3. The power supply of claim 1, wherein the mode determination unit comprises:
- a first comparator for determining if conditions for burst-mode operation are satisfied, and outputting a corresponding sensing signal, the first comparator- performing this operation using the signal sensed in the output power sensing unit;
- a switch Off detector for detecting a basic Off position of the switching unit;
- a burst signal regulating unit for receiving the burst mode sensing signal output from the first comparator and adjusting the burst mode sensing signal so that it corresponds to a signal output from the switch Off detector, after which the burst signal regulating unit outputs the burst mode sensing signal; and
- a burst controller for receiving the signal output from the burst signal regulating unit and outputting a signal to the switching controller to enable control into the burst mode when the burst mode sensing signal is maintained for a predetermined duration.

4. The power supply of claim 3, wherein the first comparator receives the signal sensed in the output power sensing unit through a non-inverting input terminal, and receives through an inverting input terminal a first reference voltage having a second reference value and a third reference value, which is smaller than the second reference value, thereby performing a hysteresis operation.

5. The power supply of claim 4, wherein a voltage value of the first reference voltage becomes the second reference value when the output signal of the first comparator converts to On, and the voltage value of the first reference voltage becomes the third reference value when the output signal of the first comparator converts to Off.

6. The power supply of claim 3, wherein the burst signal regulating unit comprises:
- a first AND gate for performing a logical AND operation of the output signal of the first comparator and the output signal of the switch Off detector, and outputting a resulting signal; an inverter for inverting the output signal of the first comparator and outputting a resulting signal;
- a second AND gate for performing a logical AND operation of the output signal of the inverter and the output signal of the switch Off detector, and outputting a resulting signal;
- a first switch that opens and closes according to the output signal of the first AND gate to apply a predetermined power to the burst controller; and
- a second switch that opens and closes according to the output signal of the second AND gate to ground the burst controller.

7. The power supply of claim 3, wherein the burst controller comprises:
- a capacitor that is charged and discharged according to the output signal of the burst signal regulating unit; and
- a second comparator, receiving through a non-inverting input terminal the output signal of the burst signal regulating unit through the capacitor, and comparing this signal with a second reference voltage to generate and output a control signal, the second reference voltage being of a predetermined value having a fourth reference value and a fifth reference value, and which performs a hysteresis operation, and the second comparator receiving the second reference voltage through an inverting terminal.

8. The power supply of claim 7, wherein a voltage value of the second reference voltage becomes the fourth reference value when the output signal of the first comparator converts to On, and the voltage value of the second reference voltage becomes the fifth reference value when the output signal of the second comparator converts to Off.

9. The power supply of claim 1, wherein the mode determination unit comprises:
- a variable comparator for determining if conditions for burst-mode operation are satisfied, and outputting a corresponding sensing signal, the variable comparator performing this operation using the signal sensed in the output power sensing unit;
- a switch Off detector for detecting a basic Off position of the switching transistor;
- a burst signal regulating unit for receiving the burst mode sensing signal output from the variable comparator and adjusting the burst mode sensing signal so that it corresponds to a signal output from the switch Off detector, after which the burst signal regulating unit outputs the burst mode sensing signal; and
- a flip-flop for latching a signal corresponding to the signal output from the burst signal regulating unit, then outputting this signal to the switching controller.

10. The power supply of claim 9, wherein the variable comparator receives the signal sensed in the output power sensing unit through a non-inverting input terminal, and receives through an inverting input terminal a first reference voltage having a second reference value and a third reference value, which is smaller than the second reference value, thereby performing a hysteresis operation.

11. The power supply of claim 10, wherein a voltage value of the first reference voltage becomes the second reference value when the output signal of the variable comparator converts to On, and the voltage value of the first reference voltage becomes the third reference value when the output signal of the variable comparator converts to Off.

12. The power supply of claim 9, wherein the burst signal regulating unit comprises:
- a first AND gate for performing a logical AND operation of the output signal of the variable comparator and the output signal of the switch Off detector, and outputting a resulting signal;
- an inverter for inverting the output signal of the variable comparator and outputting a resulting signal to a set terminal of the flip-flop; and
- a second AND gate for performing a logical AND operation of the output signal of the inverter and the output signal of the switch Off detector, and outputting a resulting signal to a reset terminal of the flip-flop.

13. The power supply of claim 1, wherein the switching controller comprises:
- a comparator for comparing the signal sensed in the output power sensing unit with a pre-installed first reference value, and outputting a corresponding signal;
- a flip-flop, which is reset according to the output signal of the comparator;
- an OR gate for outputting a signal according to a signal output from the flip-flop and a burst control signal output from the mode determination unit; and
- a transistor for opening and closing the switching unit according to the signal output from the OR gate.

14. A method of regulating the efficiency and output power of a switched-mode power supply, the method comprising:
- receiving an input power and rectifying said input power;
- distinguishing between a normal mode and a burst mode; and controlling a switch at different time intervals, including both extended and shortened time intervals, to relay power through a transformer to an output power supply unit to drive a load;

wherein said receiving and rectifying of an input power is accomplished using a power converter.

15. The method of claim 14, further comprising:

providing a resulting power to an output power sensing unit;

sensing the power output to the load; and transmitting a signal to a mode determination unit indicative of said power output.

16. The method of claim 15, wherein transmitting the signal to the mode determination unit comprises transmitting an optical signal.

17. The method of claim 14, wherein said distinguishing between normal mode and burst mode comprises the mode determination unit receiving a signal from the output power sensing unit corresponding to the amount of the load at the output of the power supply.

18. The method of claim 17, wherein said mode determination unit comprising a comparator receives a signal from the said output power sensing unit, thereby comparing the signal to a predetermined voltage and sending a HIGH or LOW signal signifying normal mode or burst mode.

19. The method of claim 14, wherein said controlling a switch at different time intervals comprises logic gates receiving a signal from a Switch Off detector and the comparator of said mode determination unit.

20. The method of claim 19, further comprising relaying a signal to a switching controller.

21. The method of claim 20, comprising a comparator receiving as input, the output of one of the said logic devices as determined by an accompanying switch with each logic device and a predetermined voltage, and outputting a HIGH or LOW signal to the switching controller.

22. The method of claim 20, comprising a flip-flop receiving as input, the output of the normal mode logic to the input and the output of the burst mode logic to the reset, and outputting the input or a LOW state as determined by the mode determination unit to the switching controller.

23. The method of claim 22, wherein comprising logic gates include two AND gates and one inverter sending opposite signals (HIGH and LOW) to provide control signals to said comparator and said flip-flop.

24. The method of claim 14, further comprising a switching controller receiving as input, a clock signal, a signal from a phototransistor of the output power sensing unit, and a signal relayed from the mode determination unit, and outputting a voltage controlling a switch which transfers power through a transformer to the load.

25. A method of regulating the efficiency and output power of a switched-mode power supply, the method comprising:

receiving an input power and rectifying said input power using a power converter;

distinguishing between a normal mode and a burst mode; and controlling a switch at different time intervals, including both extended and shortened time intervals, to relay power through a transformer to an output power supply unit to drive a load.

26. A method of regulating the efficiency and output power of a switched-mode power supply, the method comprising:

receiving an input power and rectifying said input power;

distinguishing between a normal mode and a burst mode; and controlling a switch at different time intervals, including both extended and shortened time intervals, to relay power through a transformer to an output power supply unit to drive a load;

wherein distinguishing between the normal mode and burst mode comprises a mode determination unit that receives a signal from an output power sensing unit corresponding to the amount of the load at the output of the power supply.

27. A switched-mode power supply supporting burst-mode operation, in which the power supply provides an output power to a load, the power supply comprising:

a first power supply unit for receiving an input power and rectifying the power, and, according to a level of an output for the load, distinguishing between a normal mode and a burst mode to perform switching according to a timing corresponding to one of the normal mode or the burst mode to supply a first power; and an output power supply unit for receiving the first power from the first power supply unit according to a winding ratio of a coil to generate an output power for driving the load;

wherein the first power supply unit comprises:

a first power converter for receiving the input power, rectifying the input power, then outputting a resulting power;

an output power sensing unit for sensing the output power that is output to the load from the output power supply unit and outputting a corresponding signal;

a mode determination unit for determining when conditions for operation in a burst mode are satisfied, the mode determination unit performing this operation using a level of the signal output by the output power sensing unit, and the mode determination unit generating and outputting a corresponding control signal, wherein the mode determination unit comprises:

a first comparator for determining if conditions for burst-mode operation are satisfied, and outputting a corresponding sensing signal, the first comparator performing this operation using the signal sensed in the output power sensing unit;

a switch Off detector for detecting a basic Off position of the switching unit;

a burst signal regulating unit for receiving the burst mode sensing signal output from the first comparator and adjusting the burst mode sensing signal so that it corresponds to a signal output from the switch Off detector, after which the burst signal regulating unit outputs the burst mode sensing signal; and a burst controller for receiving the signal output from the burst signal regulating unit and outputting a signal to the switching controller to enable control into the burst mode when the burst mode sensing signal is maintained for a predetermined duration;

a switching controller for outputting a signal to control timing of the switch, including both extended and shortened time intervals, according to the signal output from the output power sensing unit and a signal output from the mode determination unit; and a switching unit for switching On and Off according to the operation of the switching controller to enable transmission of power converted by the first power converter to the output power supply unit.

* * * * *